Nov. 12, 1963   J. W. PEGRUM   3,110,818
CONTROL SYSTEMS

Filed May 10, 1960   2 Sheets-Sheet 1

Inventor
James W. Pegrum
By *J. P. Moran*
Attorney

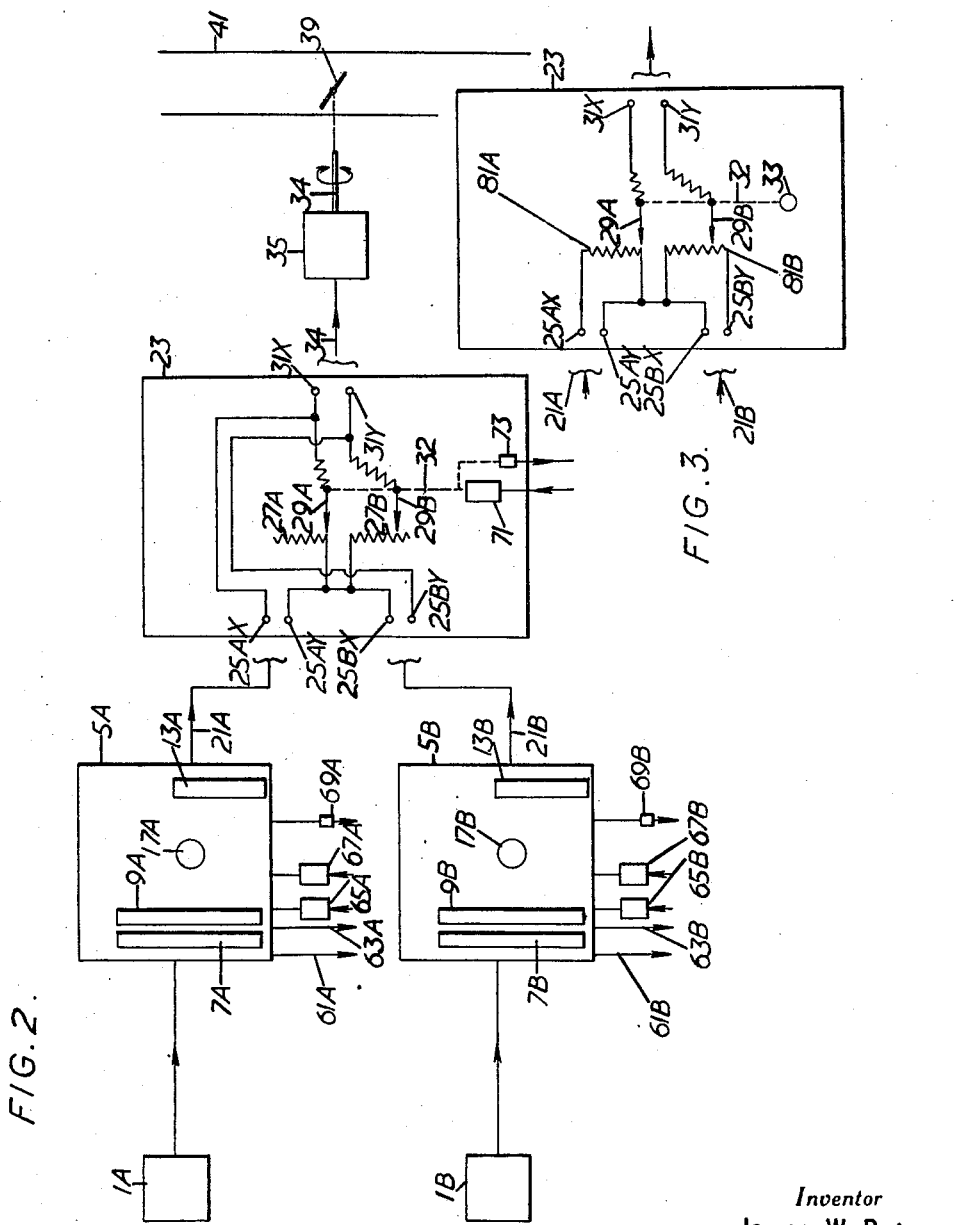

United States Patent Office 3,110,818
Patented Nov. 12, 1963

3,110,818
CONTROL SYSTEMS
James W. Pegrum, London, England, assignor to Babcock & Wilcox Limited, London, England, a British company
Filed May 10, 1960, Ser. No. 28,133
Claims priority, application Great Britain May 11, 1959
4 Claims. (Cl. 307—80)

This invention relates to control systems. In automatic control systems the necessity sometimes arises of using different controllers at different times or under different conditions for effecting regulation of a variable and the problem then arises of changing over from one controller to the other without interruption of the automatic control.

One instance in which the problem arises is in a control system for a vapour generator in which a wide range controller is utilised during the starting up of the vapour generator from a cold state and a narrow range control is utilised during normal operation of the vapour generator to effect a numerically more exact control over a relatively narrow range of normal working values of the variable to be controlled.

The invention is applicable, for example, to a control system for a vapour generator utilising a digital computer for effecting starting up and/or shutting down and for effecting control during the normal operation of the generator. Such a system is described in the specification of the co-pending U.S. patent application of Ronald E. Zoller, Serial No. 833,268, filed August 12, 1959.

A control system according to the present invention has an electrically controlled device for effecting regulation of a variable, first and second controllers for alternatively controlling the device and transfer means for transferring the effective control of the device from one controller to the other controller, the transfer means being arranged to receive the outputs from both controllers and to afford a control of the controlled device that is normally dependent on the output of one or other of the controllers but which during a transfer operation is dependent on variable proportions of the outputs of the controllers and varies progressively to transfer predominance in the output from one controller to predominance in the output from the other controller, whereby as the transfer means are operated the control of the controlled device is transferred smoothly from one controller to the other.

The invention will now be described, by way of example, with reference to the accompanying drawings, in which:

FIGURE 2 is a schematic drawing of a control system for one of the operating variables in a vapour generator and forming part of a more comprehensive control system subject to a supervisory control by a digital computer; and FIGURE 3 is a circuit diagram for a modified form of a transfer means shown in FIGURE 1.

Figure 1:
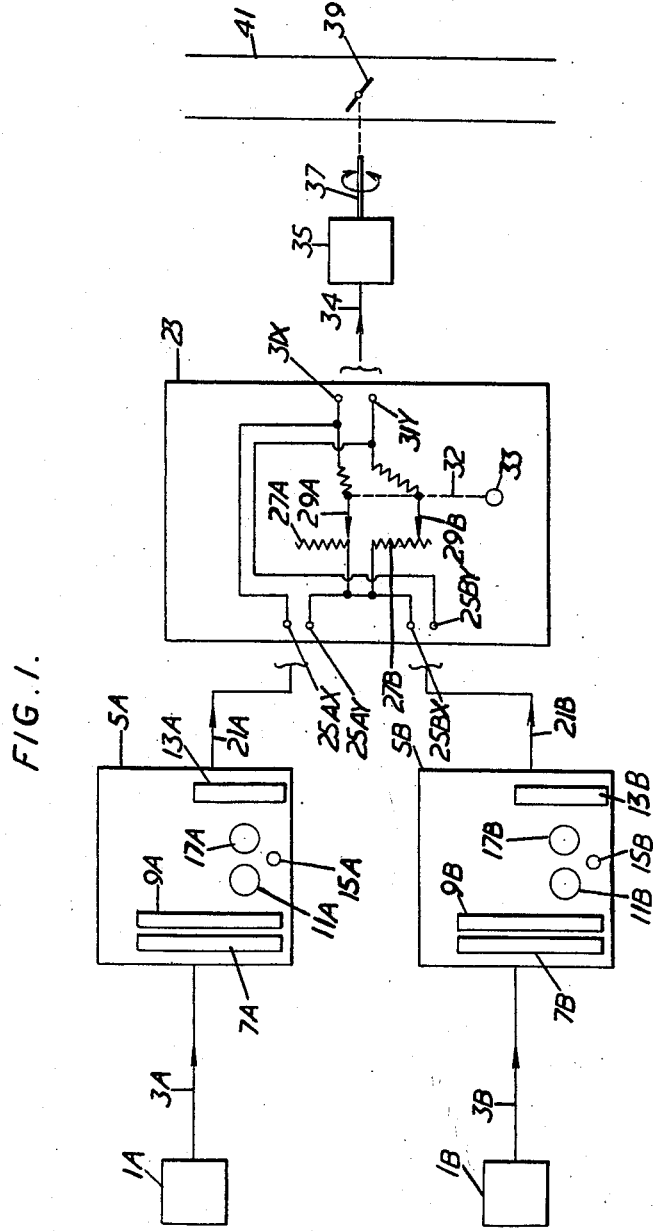
FIGURE 1 is a schematic drawing of a control system for one of the operating variables in a vapour generator.

Referring first to FIGURE 1, the control system depicted has as the controlled variable the steam pressure at the outlet of a steam generating and superheating unit, and operates by controlling the rate of firing of a furnace associated with that unit to maintain the steam pressure at an optimum value, the optimum value varying from time to time. A pressure sensitive device 1A having a normal working range from zero up to 2,400 pounds per square inch supplies an input signal through a lead 3A to a first automatic controller 5A. The controller is of a form shown and described in said copending application Serial No. 833,268 with the omission of certain devices whereby the controller can be incorporated in a more comprehensive control system subject to a supervisory control by a digital computer.

Briefly, this controller 5A includes a meter 7A on which is indicated the pressure to which the device 1A is subjected, a set-value meter 9A associated with a control knob 11A, adjustment of the knob effecting a change in the selected set value, which is indicated on the meter 9A, an output meter 13A indicating the instantaneous value of an output signal from the controller, a changeover switch 15A by which the controller can be changed from a state in which the output signal is determined automatically by the controller to a state in which the output signal is determined manually by an operator, and an adjusting knob 17A by which the output signal can be adjusted by the operator when the controller is under manual control. As described more fully in the co-pending application referred to above, the controller continuously compares the measured value indicated on the meter 7A with the set value indicated on the meter 9A and provides a control signal which is derived from the error between these two values and includes proportional, integral and differential terms. When switch 15A is set for automatic control, the control signal determines the output signal, but when switch 15A is set for manual control, the control signal is blocked and replaced by a similar signal determined by the setting of adjusting knob 17A.

A second pressure sensitive device 1B having a normal working range from 2,300 to 2,500 pounds per square inch supplies an input signal through a lead 3B to a second automatic controller 5B. Controller 5B is similar to controller 5A and corresponding parts are indicated by the numerals utilised above but with the suffixes changed from A to B. However, the controller 5B is adapted to operate over the working range from 2,300 to 2,500 pounds per square inch, and as a result is capable of effecting a numerically more exact control than is the wide range controller 5A.

The outputs from the controllers 5A and 5B are applied by leads 21A and 21B respectively to a transfer means 23 having a pair of input terminals 25AX and 25AY to which lead 21A is connected and a second pair of input terminals 25BX and 25BY to which lead 21B is connected.

The transfer means 23 includes a first transfer device in the form of a rheostat 27A and a second transfer device in the form of a second rheostat 27B. One end of each rheostat is connected to a common conductor connected to terminals 25AY and 25BX. The slider 29A of rheostat 27A is connected to a first output terminal 31X, to which is also connected the input terminal 25AX. The slider 29B of rheostat 27B is connected to a second output terminal 31Y, to which is also connected the input terminal 25BY. The two sliders 29A, 29B are mechanically coupled by an insulated link 32 so that they move in unison under the control of an adjusting knob 33.

Each of the controllers 5A and 5B provides an output signal in the form of a direct current which varies, over the operating range of the controller, between the limits zero and 15 ma. The terminals 25AX, 25BX, and 31X are all positive terminals, and the terminals 25AY, 25BY, and 31Y are all negative terminals.

The output from the transfer means 23, appearing at the terminals 31X and 31Y, is applied through a lead 34 to an electro-hydraulic actuator 35 having an output shaft 37 coupled to a damper 39 arranged to control the flow of air through a duct 41. This duct 41 is the outlet duct from a pulverising mill arranged to supply pulverised fuel entrained in a current of air for combustion in the furnace associated with the steam generator. Adjustment of the damper 39 changes the rate of supply of fuel to the furnace.

During operation of the steam generating and superheating unit, either the controller 5A or the controller 5B will normally effect a suitable control of the steam pressure by effecting adjustment of the firing rate of the unit through adjustment of the damper 39. During starting-up and closing down of the unit, the wide range controller 5A will be used, and during normal operation of the unit, in which the steam pressure will remain in the range 2,300 to 2,500 pounds per square inch, the narrow range controller 5B will be used.

When the two sliders 29A and 29B are in the positions shown, the terminals 25AX and 25AY are effectively short-circuited, so that the output current of controller 5A flows from terminal 25AX to terminal 31X, thence through slider 29A to terminal 25AY, substantially none of this current flowing in lead 34. At the same time, the full resistance of rheostat 27B between the terminals 25BX and 31Y is so large that only a negligible shunting effect of the output current of controller 5B is produced, so that the current supplied to lead 34 by the output terminals 31X and 31Y is substantially that supplied by the controller 5B. Therefore the actuator 35 is completely under the control of the controller 5B.

Change over from one controller to the other is effected by the adjustment of knob 33, which moves the two sliders 29A and 29B in unison along the resistances of the two rheostats 27A, 27B. At all positions of the sliders the effective part of the resistance of rheostat 27A will act as a shunt between the terminals 25AX and 25AY and a series resistance for the part of the current flowing from controller 5B through the lead 34, while the effective part of the resistance of rheostat 27B will act as a shunt between the terminals 25BX and 25BY and as a series resistance for the part of the current flowing from controller 5A through the lead 34. Consequently, as the two sliders are moved in unison from their lower limiting positions shown in FIGURE 1 to their upper limiting positions the dominance of the current from controller 5B in the composite output current in lead 34 will first progressively be reduced and then replaced by a progressively increasing dominance by the current from controller 5A.

At the upper limiting positions of the two sliders, the terminals 25BX and 25BY are effectively short-circuited, so that the output current from controller 5B flows from terminal 25BY to terminal 31Y, thence through slider 29B to terminal 25BX, substantially none of the current flowing in the lead 34. At the same time, the full resistance of the rheostat 27A between the terminals and 25AY is so large that only a negligible shunting effect of the output current from controller 5A is produced, so that the current supplied to the lead 34 by the terminals 31X and 31Y is substantially that supplied by the controller 5A. Therefore the actuator 25 is completely under the control of the controller 5A.

Although in the above description it has been assumed that when a rheostat is in the "all-in" position the slider remains in contact with the rheostat resistance, it may if desired move out of contact with the resistance at this terminal position in order to raise the resistance from the relatively high "all-in" value up to infinity.

For every value of the composite output current in the lead 34 the actuator 35 sets the damper 39 in a unique position, so effecting a desired control tending to bring the steam pressure to, and maintain it at, the set value on that of the controllers 5A and 5B which is effective.

Since, at the moment when it is desired to change over from wide range controller 5A to narrow range controller 5B or vice versa, it is unlikely that the currents in lead 21A and 21B will be exactly equal and since, even if they are exactly equal, it is most desirable to avoid a current surge in lead 34, the transfer means 23 give a considerable improvement in the smoothness of the transfer from one controller to the other, compared with a simple switching device, without the need for the exercise of any skill on the part of the operator, who needs merely to turn the knob 33 steadily from one limiting position to the other.

If desired, the knob 33 may be replaced with a reversible motor means the operation of which is controlled by relay means responsive to the value of a variable which is being controlled. For example, in the arrangement described above suitable motor means could effect operation of the transfer means when the steam pressure rose past 2,350 pounds per square inch and as it fell past 2,300 pounds per square inch.

Referring now to the embodiment of the invention illustrated in FIGURE 2, for the most part the arrangement is similar to that shown in FIGURE 1, and similar numerals are used to denote similar parts. However, in order that the control system may be incorporated in a more comprehensive control system under supervisory control by a digital computer, the two controllers 5A and 5B are provided respectively with output leads 61A and 61B each carrying a signal representative of the measured value on meter 7A or meter 7B, with output leads 63A and 63B each carrying a signal representative of the set value on meter 9A or meter 9B, with reversible electric motors 65A and 65B replacing respectively the knobs 11A and 11B for varying the set values and under the control of the digital computer, with reversible electric motors 67A and 67B replacing respectively the knobs 15B and 15A and effecting change over from automatic to manual and under the control of the digital computer, and with signal means 69A and 69B each adapted to give a positive indication to the digital computer of the setting of the associated controller for automatic or manual control.

In the transfer means 23 the adjusting knob 33 for the two sliders 29A and 29B is replaced by a reversible electric motor 71 under the control of the digital computer and provided with suitable limit switches and signal means 73 are adapted to give a positive indication to the digital computer when the sliders are set to each limiting position.

The operation of the central system of FIGURE 2 is analogous to that of the system of FIGURE 1, the difference being that the initiation of changes of the set values of the controllers and the initiation of the change over from one controller to the other is effected by the digital computer in accordance with a coded programme stored in that computer.

Each of the controllers shown in FIGURES 1 and 2 produces an output control signal in the form of a varying direct current, the magnitude of the current indicating the desired control effect. The invention is applicable to other forms of controller, for example, to controllers producing an output control signal in the form of varying direct-current voltages. FIGURE 3 illustrates a modified form of transfer means for use in such a case.

Referring to FIGURE 3, the transfer means 23 is modified by the substitution of potentiometers 81A and 81B for the rheostats 27A and 27B. The potentiometer 81A is connected across the input terminals 25AX, 25AY, the potentiometer 81B is connected across the input terminals 25BX, 25BY, and the terminals 25AY and 25BX are connected together. The sliders 29A and 29B are connected together by an insulated link 32 to move in unison, and the link 32 is adjustable by a knob 33. The two sliders 29A and 29B are connected respectively to the two output terminals 31X, 31Y. The terminals 25AX, 25BX and 31X are all positive terminals and the terminals 25AY, 25BY and 31Y are all negative terminals.

With the sliders 29A and 29B in the positions shown terminal 31X is at the potential of terminal 25BX, terminal 31Y is at the potential of terminal 25BY, and the potential difference across the terminals 31X, 31Y is therefore equal to the output voltage of the controller 5B.

Upon operation of the knob 33 to move the two sliders 29A and 29B upwardly in unison, the output voltage between the terminals 31X, 31Y is the sum of the two voltage drops respectively across the lower part of the resistance of the potentiometer 81A and across the upper part of the resistance of the potentiometer 81B. Consequently, as the two sliders are moved in unison from the lower limiting positions shown in FIGURE 3 to their upper limiting positions, the dominance of the voltage output from controller 5B in the composite output voltage at lead 34 will first progressively be reduced and then replaced by a progressively increasing dominance by the voltage from controller 5A. At the upper limiting positions of the two sliders the output voltage across the terminals 31X, 31Y is equal to the output voltage of the controller 5A.

The controllers described above, by way of example, may be replaced by other forms of controller. Thus in the arrangement of FIGURE 1, the wide range controller may be a digital computer provided with information as to measured steam pressure and comparing this measured value at suitable intervals with a coded value stored in a programme store or with an optimum value calculated by the computer from information supplied to it. To bridge the periods when the digital computer is performing other functions, a suitable holding device is interposed between the computer and the transfer means in order to provide a steady output which is resettable by the computer.

Further, the variable to be controlled may be a calculated variable, for example the output from an analogue computer supplied with information as to steam pressure and steam flow and effecting a calculation involving those quantities. In such a case the controlled device effects a regulation of the variable indirectly by changing one or more of the basic variables, for example, steam pressure.

In the embodiments of the invention described above the controlled device regulates the supply of fuel to a furnace, but many other applications exist. For example, the variable to be regulated may be the air pressure in the burner windbox of a steam generator furnace, one of the controllers being a digital computer and the other controller being operated by a signal derived from the pressure of the steam leaving the generator. In this case the controlled device is a secondary air damper. The computer is used for control during starting up of the steam generator and the other controller is effective during normal operation of the steam generator.

In another embodiment of the invention, the variable to be regulated is the rate of supply of excess air to a furnace through the register or registers of a pulverised fuel burner or pulverised fuel burners, the controlled device is the air register vanes or dampers of the burners, one of the controllers is a digital computer and the other controller is a controller which primarily regulates the supply of fuel to the burner or burners but in addition serves to control the air register vanes. In this arrangement the computer is effective during starting up of a steam generator fired by the furnace to limit the gas temperature at the outlet from the furnace through control of the amount of excess air. Control is also by the computer during shutting down of the vapour generator. During normal operation of the vapour generator, the other controller is effective and acts to maintain a suitable ratio between the rate of fuel supply and rate of air supply.

Although in each of the arrangements described above the two controllers involved are automatic controllers, clearly the invention may also be applied to an arrangement involving a manually operated controller and an automatic controller.

I claim:

1. A control system having an electrically controlled device for effecting regulation of a variable, first and second controllers alternatively controlling the device and alternatively maintaining operation of the device independently of each other, said first controller normally effecting regulation of the variable over a wide range of values, said second controller normally effecting regulation of the variable over a narrow range of values, and transfer means completely transferring the effective control and operation of the device from either one of the controllers to the other controller, the transfer means being arranged to receive the outputs from both controllers and to afford a control of the controlled device which is normally dependent on the output of either one or other of the controllers but during a transfer operation is dependent on variable proportions of the outputs of both controllers and varies progressively to transfer predominance of the output from one controller to predominance of the output from the other controller.

2. A control system as claimed in claim 1, wherein the transfer means include two transfer devices connected respectively to the outputs of the two controllers and each comprising means adjustable to vary the magnitude of the component of the control which is derived from the associated controller, and the adjustment means for the two transfer devices are so coupled together that they operate in step with one another.

3. A control system as claimed in claim 2, wherein each of the two transfer devices is in the form of a variable resistance connected across the output terminals of the controller with which it is associated.

4. A control system as claimed in claim 2, wherein each of the two transfer devices is in the form of a potentiometer connected across the output terminals of the controller with which it is associated, the sliders of the two potentiometers provide the combined output or control, the sliders move simultaneously from a first end of each potentiometer to the second end of each potentiometer, and the first end of one potentiometer is connected to the second end of the other potentiometer.

References Cited in the file of this patent

UNITED STATES PATENTS

| | | |
|---|---|---|
| 1,574,548 | Benjamin | Feb. 23, 1926 |
| 2,517,081 | Caldwell | Aug. 1, 1950 |
| 2,657,347 | Bristol | Oct. 27, 1953 |
| 2,864,343 | Jenkins | Dec. 16, 1958 |
| 2,874,906 | Nossen | Feb. 24, 1959 |
| 2,926,636 | Paulison | Mar. 1, 1960 |
| 2,932,471 | Exner et al. | Apr. 12, 1960 |
| 2,949,273 | Roper et al. | Aug. 16, 1960 |